US012181175B2

United States Patent
Beneke et al.

(10) Patent No.: US 12,181,175 B2
(45) Date of Patent: Dec. 31, 2024

(54) DAMPER WITH SPRING THRUST BEARING AND FLUSH END CAP

(71) Applicant: Air Distribution Technologies IP, LLC, Milwaukee, WI (US)

(72) Inventors: Jeffrey S. Beneke, Peculiar, MO (US); Edward N. Koop, Olathe, KS (US); Raguraman Gnanavadivel, Kodaikanal (IN)

(73) Assignee: Air Distribution Technologies IP, LLC, Milwaukee, WI (US)

( * ) Notice: Subject to any disclaimer, the term of this patent is extended or adjusted under 35 U.S.C. 154(b) by 310 days.

(21) Appl. No.: 17/589,378

(22) Filed: Jan. 31, 2022

(65) Prior Publication Data

US 2023/0243550 A1    Aug. 3, 2023

(51) Int. Cl.
  *F24F 13/14*    (2006.01)
  *B29C 33/40*    (2006.01)

(52) U.S. Cl.
  CPC ...... *F24F 13/1486* (2013.01); *F24F 13/1406* (2013.01)

(58) Field of Classification Search
  CPC . F24F 13/1406; F24F 13/1426; F24F 13/1486
  See application file for complete search history.

(56) References Cited

U.S. PATENT DOCUMENTS

| | | | |
|---|---|---|---|
| 1,716,444 A * | 6/1929 | Jamar | F24F 13/1426 126/295 |
| 3,084,715 A | 4/1963 | Scharres | |
| 7,363,748 B2 | 4/2008 | Gabriele | |
| 8,500,528 B2 | 8/2013 | Leonhard et al. | |
| 2019/0248207 A1 | 8/2019 | Lucka-Gabor et al. | |

FOREIGN PATENT DOCUMENTS

| | | | | |
|---|---|---|---|---|
| DE | 202005004128 U1 * | 7/2005 | ............ | F16K 1/223 |
| EP | 0524877 A1 * | 1/1993 | | |
| EP | 1119729 | 8/2001 | | |
| KR | 200302331 Y1 * | 1/2003 | | |

OTHER PUBLICATIONS

DE-202005004128-U1 and translation (Year: 2005).*
Camoni, EP-0524877-A1 and translation (Year: 1993).*
(Continued)

*Primary Examiner* — Steven S Anderson, II
(74) *Attorney, Agent, or Firm* — Michael Best & Friedrich LLP

(57) ABSTRACT

A damper of a heating, ventilation, and/or air conditioning (HVAC) system includes a damper blade having a blade body with a hollow portion extending to an end of the blade body. The damper also includes an axle defining an axis about which the damper blade is configured to rotate, where the axle extends from the end of the blade body. The damper also includes a spring thrust bearing having a spring thrust bearing opening through which the axle extends. The spring thrust bearing is configured to support an axial load of the damper blade. The damper also includes an end cap disposed within the hollow portion of the blade body such that the end cap is flush with the end of the blade body.

16 Claims, 11 Drawing Sheets

(56) References Cited

OTHER PUBLICATIONS

KR-200302331-Y1 and translation (Year: 2003).*
Gebhardt-Stahl GmbH, "Volume control damper kit", Website: https://www.gebhardt-stahl.de/en/hvac-components/self-assembly-systems/volume-control-damper-kit/ 2022, pp. 1-13.
Chiealle, "Wooden Window Blinds" Website: https://www.pinterest.com/pin/295830269249705150/ pp. 1-3.
HD Series "Heavy Duty Air Control and Low Leakage Dampers" Website: http://www.bsb-dampers.co/customer/documents/hd_series.pdf 2021, pp. 1-17.

* cited by examiner

DAMPER WITH SPRING THRUST BEARING AND FLUSH END CAP

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and air conditioning (HVAC) systems are generally configured to provide temperature controlled air to an internal space. For example, various temperature and pressure control devices of the HVAC system may be employed to generate one or more air flows, such as an air flow having a particular temperature that is directed (e.g., via ductwork) to the internal space. In certain embodiments, dampers may be employed to regulate the air flow(s) (e.g., through the ductwork). For example, the damper may be controlled to various settings (e.g., fully opened, partially opened, fully closed) corresponding to various desired air flow parameters (e.g., pressure, flow rate, temperature, etc.) and/or operating modes (e.g., enabling the air flow, disabling the air flow, etc.). Unfortunately, traditional dampers may include certain components, such as blade assemblies, that are arranged in ways that negatively affect a performance of the traditional damper, an efficiency of the traditional damper, and the like. For example, certain traditional dampers may not be fully equipped to adequately handle mechanical loads associated with the traditional damper, such as axial loads associated with blades of the traditional damper. Additionally or alternatively, certain traditional dampers may include features intended to handle mechanical loads associated with the traditional damper, but that cause undesirable air flow leakage through portions of the traditional damper (e.g., between blades of the damper, around bearing assemblies associated with the blades of the damper, etc.). Accordingly, it is now recognized that improved dampers are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An embodiment of the present disclosure includes a damper of a heating, ventilation, and/or air conditioning (HVAC) system, where the damper includes a damper blade, an axle defining an axis about which the damper blade is configured to rotate, and a spring thrust bearing having a central portion defining a spring thrust bearing opening configured to receive the axle. The spring thrust bearing is configured to support an axial load of the damper blade via a spring force applied to the damper blade.

Another embodiment of the present disclosure includes a damper of a heating, ventilation, and/or air conditioning (HVAC) system, where the damper includes a damper blade, an axle defining an axis about which the damper blade is configured to rotate, and a spring thrust bearing having a central portion defining a spring thrust bearing opening configured to receive the axle. The spring thrust bearing is configured to support an axial load of the damper blade. The damper also includes a radial bearing defining a radial bearing opening configured to receive the axle such that the radial bearing is configured to support a radial load of the damper blade. The spring thrust bearing comprises a skirt extending from the central portion of the spring thrust bearing, the skirt defines a cavity, and the skirt is configured to receive the radial bearing in the cavity.

Another embodiment of the present disclosure includes a damper of a heating, ventilation, and/or air conditioning (HVAC) system. The damper includes a damper blade having a blade body including a hollow portion extending to an end of the blade body. The damper also includes an axle defining an axis about which the damper blade is configured to rotate, where the axle extends from (e.g., through) the end of the blade body. The damper also includes a spring thrust bearing configured to support an axial load of the damper blade, and an end cap configured to be disposed within the hollow portion of the blade body such that the end cap is flush with the end of the blade body.

BRIEF DESCRIPTION OF THE DRAWINGS

Various aspects of this disclosure may be better understood upon reading the following detailed description and upon reference to the drawings in which.

DETAILED DESCRIPTION

Figure 1:
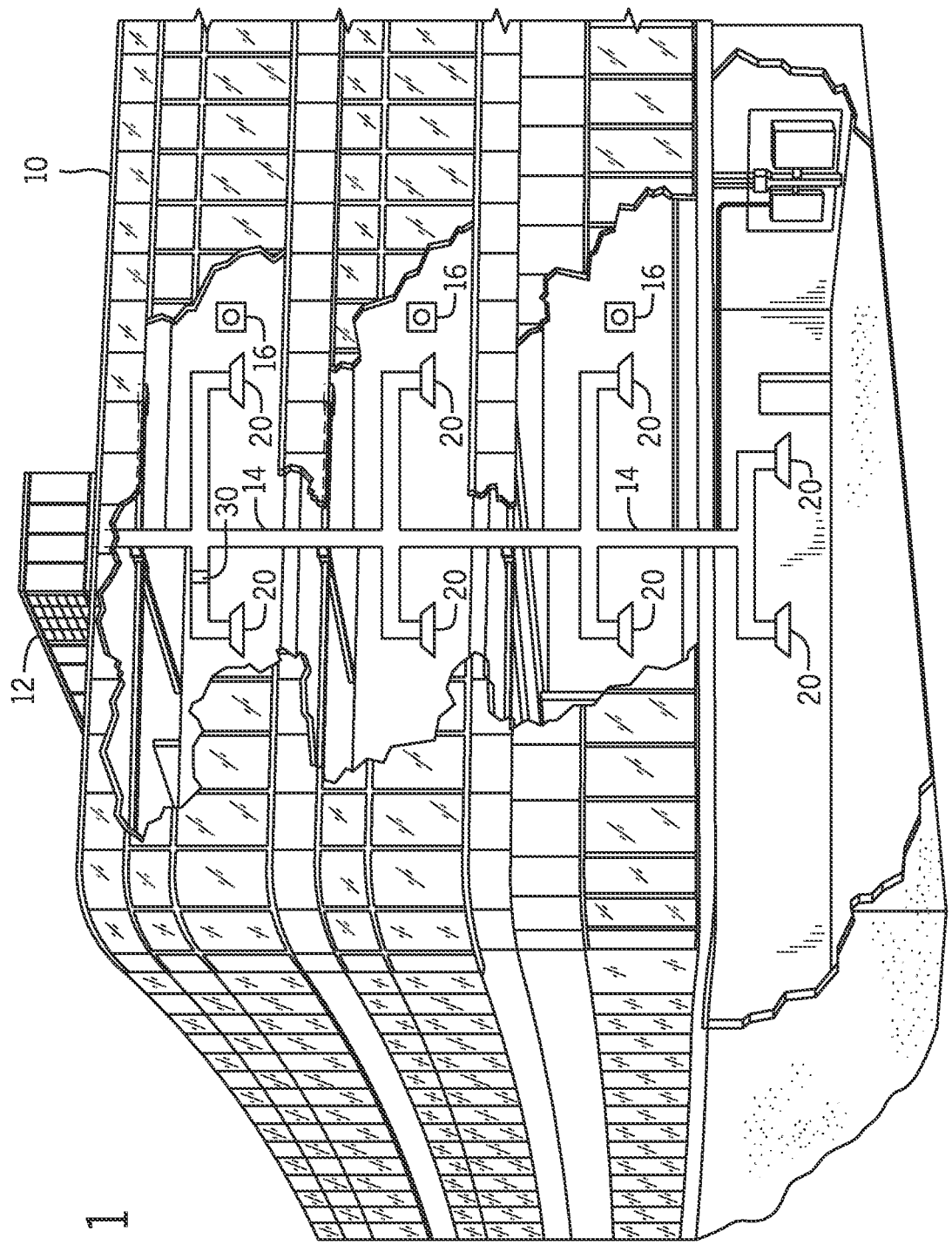
FIG. 1 is a perspective view a heating, ventilation, and air conditioning (HVAC) system for building environmental management, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to a damper employed in a heating, ventilating, and air conditioning (HVAC) system. More specifically, the present disclosure is directed to a frame and blade assembly of the damper. The frame includes jamb seals disposed along opposing sides of the frame. The blade assembly includes a blade having a blade body, seals disposed along edges of the blade body, and end caps disposed in hollow portions of the blade body such that the end caps are flush with ends of the blade body, where the end caps are configured to contact the jamb seals disposed along the opposing sides of the frame of the damper. Each blade assembly also includes bearing assemblies adjacent the ends of the blade body, where the bearing assemblies each include a spring thrust bearing configured to maintain a spring force between the frame (e.g., via contact with the jamb seal) and the blade body such that an axial position of the blade body is maintained. These and other features in accordance with the present disclosure are described in detail below.

In accordance with present embodiments, a damper may include a damper frame and a number of blade assemblies disposed in the damper frame. The blade assemblies may include, for example, horizontally or vertically oriented blades. That is, the blades may extend parallel with a gravity vector (e.g., vertically oriented) or perpendicular to the gravity vector (e.g., horizontally oriented). Other orientations are also possible.

Each blade may include a blade body (e.g., formed by extruded metal) and seals (e.g., rubber or silicone seals) extending along length-wise edges of the blade body. The blade, including the blade body and the seals, may include a cross-section forming a generally airfoil shape. The blade body may also include a first hollow portion adjacent a first end of the blade body and a second hollow portion adjacent the second end of the blade body. A first end cap may be disposed in the first hollow portion such that the first end cap is flush with the first end of the blade body, and a second end cap may be disposed in the second hollow portion such that the second end cap is flush with the second end of the blade body. In some embodiments, each hollow portion may include two hollow segments, and each end cap may include two end cap portions corresponding to the two hollow segments. In general, the end caps are flush with the ends of the blade body, such that the end caps are in contact with jamb seals disposed along opposing sides of the frame of the damper. Further, in some embodiments, the end caps and the jamb seals may include a rubber material, silicone material, or some other similar material, which reduce a friction between the end caps and the jamb seal as the blade body is rotated between various operating positions. As will be appreciated in view of further description below, the end caps being flush with the ends of the blade body (and in contact with the jamb seals) may reduce undesirable air flow leakage through the damper adjacent the ends of the blade body.

In addition to the features described above, each blade assembly may include bearing assemblies employed at the ends of the blade body of each blade. For example, each bearing assembly may include a spring thrust bearing having a central portion and a spring thrust bearing opening defined by the central portion, where the spring thrust bearing opening is configured to receive an axle. That is, the axle may extend through the blade body, beyond the ends of the blade body, and through the spring thrust bearing openings of the spring thrust bearings disposed on opposing sides of the blade assembly. Further, the axle may be rigidly coupled to the blade body of the blade such that rotation of the axle imparts rotation to the blade. For example, a torque may be applied to the axle to cause rotation of the axle and, thus, the blade. In some embodiments, the spring thrust bearing may be sized such that the axle does not contact the spring thrust bearing. For example, an inner diameter of the spring thrust bearing opening may be greater than an outer diameter (or other size parameter) of the axle, such that a gap exists between the spring thrust bearing and the outer diameter of the axle.

As previously described, each blade of the damper may be disposed in a damper frame. Further, one or more jamb seals may be disposed along opposing sides or walls of the frame adjacent to ends of the blades. The above-described spring thrust bearing may include spring elements (e.g., arms) extending from a circumferential skirt of the spring thrust bearing and contacting, for example, the jamb seal disposed along the wall of the frame. Accordingly, the spring elements (e.g., arms) of the spring thrust bearing may exert a spring force between the frame of the damper and the blade body of the blade of the damper. The spring force is configured to cause the spring thrust bearing to support or carry an axial load of the blade and maintain an axial position of the blade relative to the frame. The spring thrust bearing may be particularly useful in dampers employing vertically oriented blades, as a weight of each vertically oriented blade may otherwise cause the blade to move downwardly relative to a gravity vector (e.g., causing a gap between the blade and an upper end of the frame). However, the spring thrust bearing configured to support axial loads of the blade also reduces air flow leakage in the context of dampers employing horizontally oriented blades. In general, the spring thrust bearing reduces or negates undesirable axial movement of the blade, and helps to seal areas around the ends of the blade, thereby blocking a possible air flow leakage path around the end of the blade. Further, the above-described end cap, positioned in the hollow portion of the blade body of the blade, may be in contact with the jamb seal disposed on the wall of the damper frame. Thus, intimate contact between the end cap(s) and the jamb seal(s) may block a possible air flow leakage path around the end of the blade body.

In some embodiments, the spring thrust bearing may not rotate with the blade. For example, the blade may rotate as the spring thrust bearing does not rotate, such that a surface corresponding to the end of the blade body (and/or the end cap) slides along a bottom surface of the central portion of the spring thrust bearing. In other embodiments, the spring thrust bearing may include bearing elements (e.g., balls or rollers) disposed between a first race and a second race of the spring thrust bearing, such that a portion of the spring thrust bearing (e.g., the first race) rotates in response to rotation of the blade body. Other configurations of the spring thrust bearing are also possible Further to the points above, a radial bearing separate from the spring thrust bearing may also be employed in the bearing assembly and configured to support a radial load of the blade. For example, the radial bearing may be disposed in a cavity defined by an inner diameter of the circumferential skirt of the spring thrust bearing. The radial bearing may contact the axle such that the radial bearing supports radial loads imparted onto and/or from the axle. The radial bearing(s), the spring thrust bearing(s), the end cap(s), the jamb seal(s), and other features in accordance with the present disclosure will be described in detail below with reference to the drawings. In general, presently disclosed embodiments reduce undesirable air flow leakage around ends of the blade body, reduce an amount of torque needed to turn the blades of the damper to various positions, and improve an efficiency and performance of the damper and HVAC system.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10. However, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system.

The HVAC unit 12 may be an air cooled device that implements a refrigeration cycle to provide conditioned air to the building 10. Specifically, the HVAC unit 12 may include one or more heat exchangers across which an airflow is passed to condition the airflow before the airflow is supplied to the building. In the illustrated embodiment, the HVAC unit 12 is an AHU, such as a rooftop unit (RTU) which conditions a supply air stream, such as environmental air and/or a return airflow from the building 10. Outdoor units, indoor units, or other conditioning schemes are also possible. After the HVAC unit 12 conditions the air, the air is supplied to the building 10 via ductwork 14 extending throughout the building 10 from the HVAC unit 12. For example, the ductwork 14 may extend to various individual floors or other sections, such as rooms, of the building 10. Terminal units 20 associated with the floors, rooms, or other sections of the building 10 may be connected to the ductwork 14 and may be configured to distribute the airflow to the floors, rooms, or other sections of the building 10. In some embodiments, the terminal units 20 may include air conditioning features in addition to, or in the alternate of, the air conditioning features of the HVAC unit 12.

In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream. Additionally or alternatively, other HVAC equipment may be installed at the terminal units 20 or in another area of the building, such as a basement 21 (e.g., a boiler may be installed in a basement of the building 10). A control device 16, one type of which may be a thermostat, may be used to designate the temperature of the conditioned air. The control device 16 also may be used to control the flow of air from the HVAC unit 12, through the ductwork 14, to the terminal units 20, or any combination thereof. For example, the control device 16 may be used to regulate operation of one or more components of the HVAC unit 12 and/or terminal units 20. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

As previously described, the system of FIG. 1 may include the ductwork 14 configured to route conditioned air to various spaces of the building 10. The ductwork 14 may include a duct section having a damper 30 disposed therein. Although only one damper 30 is illustrated in FIG. 1, multiple instances of the damper 30 may be employed. Further, the damper(s) 30 may be employed as a vent (e.g., adjacent the terminal unit(s) 20) or in other locations of the HVAC system 10 than the ductwork 14. In general, the damper 30 may be controlled to various positions (e.g., fully open, fully closed, partially open) depending on desired air flow parameters (e.g., pressure, flow rate, temperature, etc.) of the air flow delivered via the ductwork 14, and/or depending on operating modes (e.g., enabling the air flow, disabling the air flow, etc.) of the HVAC system 10. For example, the damper 30 may include a frame, blades disposed in the frame, and various features in accordance with the present disclosure (e.g., flush end caps, flush jamb seals, spring thrust bearings, radial thrust bearings, etc.) that reduce or negate undesirable air flow leakage relative to traditional embodiments, reduce an amount of torque needed to change a position of the damper 30 (e.g., by turning the blades of the damper 30), and improve performance and operating efficiency of the damper 30 and HVAC system 10 generally. These and other aspects of the disclosure are described in detail below with reference to the drawings.

Figure 2:
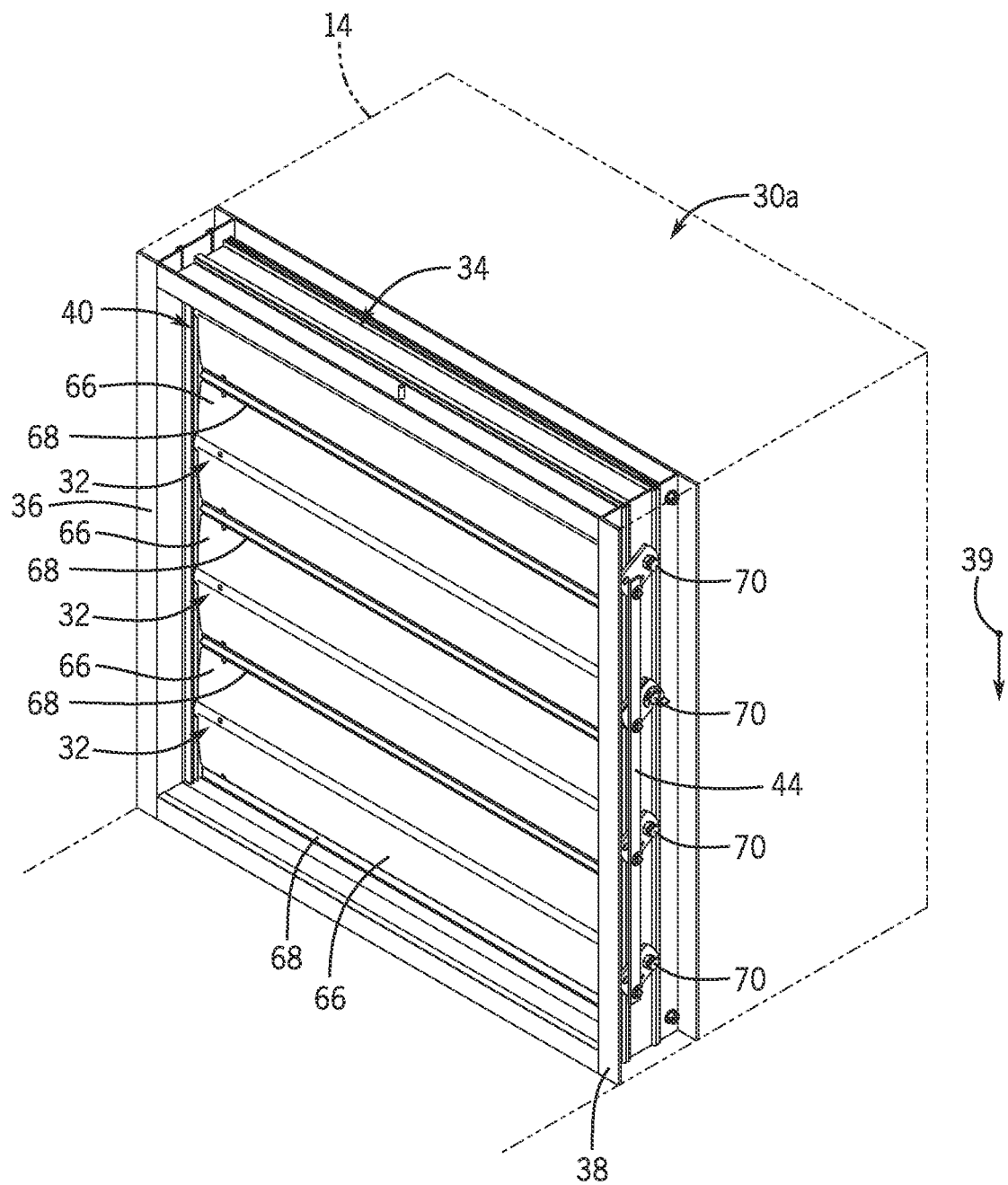
FIG. 2 is a perspective view of a damper for use in the HVAC system of FIG. 1, the damper having horizontally oriented blades and features configured to support radial loads of the horizontally oriented blades, support axial loads of the horizontally oriented blades, and block air flow leakage through the damper, in accordance with an aspect of the present disclosure.

FIG. 2 is a perspective view of an embodiment of a damper 30*a* for use in the HVAC system of FIG. 1, the damper 30*a* having horizontally oriented blades 32 and features configured to support radial loads of the horizontally oriented blades 32, support axial loads of the horizontally oriented blades 32, and block air flow leakage through the damper 30*a*. The damper 30*a* is illustrated schematically within a duct 14, although other configurations are also possible. Each blade 32 includes a blade body 66 (e.g., formed by extruded metal) and tip seals 68 (e.g., formed by rubber, silicone, or other materials) disposed along lengthwise edges of the blade body 66. When the blades 32 are in a closed configuration, as shown, the tip seals 68 may interface with one another to seal spaces between the blades 32 and block an air flow therethrough.

A frame 34 of the damper 30*a* is configured to receive the blades 32, which extend horizontally between a first side 36 (or first wall) and a second side 38 (or second wall) of the frame 34 (e.g., perpendicular to a gravity vector 39). A first jamb seal 40 may be disposed along the first side 36 of the frame 34 and a second jamb seal (not shown due to illustrated perspective) may be disposed along the second side 38 of the frame 34. As will be appreciated in view of further discussion, each jamb seal 40 may interface or interact with aspects of the blades 32 (and/or bearing assemblies associated with the blades 32) to reduce or negate undesirable air flow leakage through the damper 30*a* (e.g., around ends of the blades 32). The jamb seals 40 and the bearing assemblies (e.g., including a spring thrust bearing, a radial bearing, etc.) will be described in detail with reference to later drawings.

Each blade 32 may include an axle 70 extending through the blade body 66 of the blade 32. As shown, the axles 70 may also extend through the side 38 of the frame 34 (and, in some embodiments, through the opposing side 36 of the frame 34). In some embodiments, one axle 70 may extend through a first end of the blade body 66 of the blade 32 and another axle 70 may extend through a second end of the blade body 66 of the blade 32 opposing the first end, although a single axle 70 may extend through an entirety of the blade body 66 of the blade 32 in some embodiments. In the illustrated embodiment, a mechanical linkage 44 couples to the axles 70. Further, in some embodiments, a rod (not shown) may be coupled to the mechanical linkage 44 and/or to one of the axles 70, and a motor (or other motion device) may bias the axles 70, via the rod and/or mechanical linkage 44, into rotation. Rotation of the axles 70 causes rotation of the blades 32 rigidly coupled thereto. Presently disclosed embodiments including the above-described blades 32, jamb seals 40, and bearing assemblies may be configured to reduce an amount of torque needed to drive the blades 32 into rotation relative to traditional embodiments, and may reduce air flow leakage through various portions of the damper 30*a*.

Figure 3:
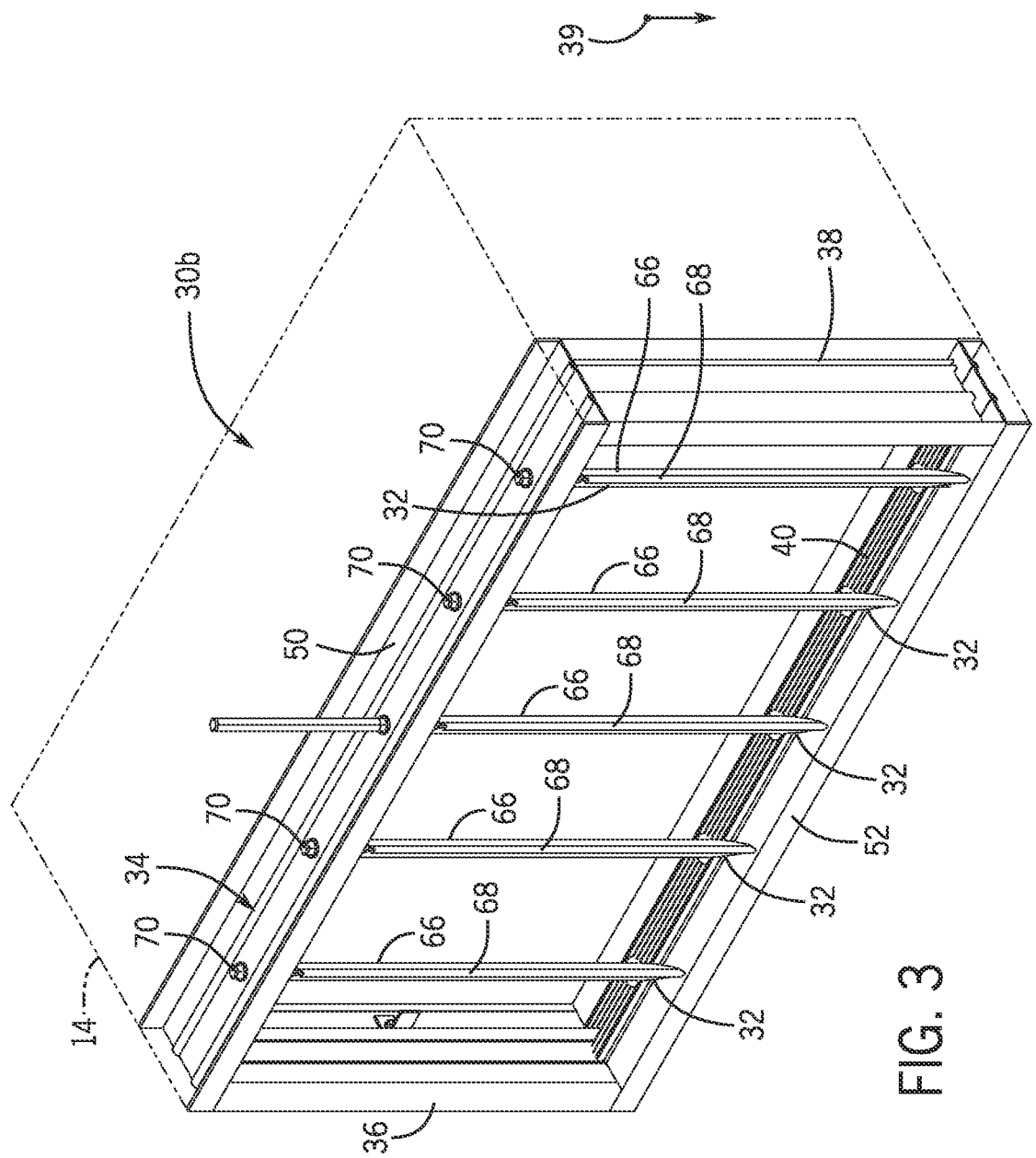
FIG. 3 is a perspective view of a damper for use in the HVAC system of FIG. 1, the damper having vertically oriented blades and features configured to support radial loads of the vertically oriented blades, support axial loads of the vertically oriented blades, and block air flow leakage through the damper, in accordance with an aspect of the present disclosure.

FIG. 3 is a perspective view of an embodiment of a damper 30*b* for use in the HVAC system 10 of FIG. 1, the damper 30*b* having vertically oriented blades 32 and features configured to support radial loads of the vertically oriented blades 32, support axial loads of the vertically oriented blades 32, and block air flow leakage through the damper 30*b*. In general, the damper 30*b* in FIG. 3 may include similar components as the damper 30*a* in FIG. 2. However, the blades 32 in FIG. 3 are oriented vertically between a third side 50 and a fourth side 52 of the frame 34 (e.g., where the vertically oriented blades 32 extend parallel with the gravity vector 39). As previously described, and as elaborated upon in detail below with reference to later drawings, bearing assemblies (e.g., including a spring thrust bearing) associated with each of the blades 32 may be configured to support or carry axial loads of the blades 32 and maintain axial positions of the blades 32 relative to the frame 34, thereby blocking or reducing undesirable air flow leakage (e.g., around ends of the blade body 66 of the blade 32, adjacent the bearing assemblies, between the blades 32 and the frame 34, etc.). This may be particularly beneficial in the damper 30*b* with vertically oriented blades 32 in FIG. 3. Indeed, because a weight of the vertically oriented blades 32 may tend to cause the vertically oriented blades 32 to move downwardly in an axial direction if said weight is unsupported, an undesirable large gap may form between the blades 32 and the third (e.g., upper) side 50 of the frame 34. Thus, supporting the weight of the vertically oriented blades via a bearing assembly at the fourth (e.g., lower) side 52 of the frame 34 may negate formation of the gap at the third (e.g., upper) side 50 of the frame 34. However, the horizontally oriented blades 32 in the damper 30*a* illustrated in FIG. 2 may also be susceptible to axial movement in response to axial loads and, thus, presently disclosed features (e.g., spring thrust bearings) are beneficial for both the damper 30*a* in FIG. 2 and the damper 30*b* in FIG. 3. These and other features will be described in detail below.

Figure 4:
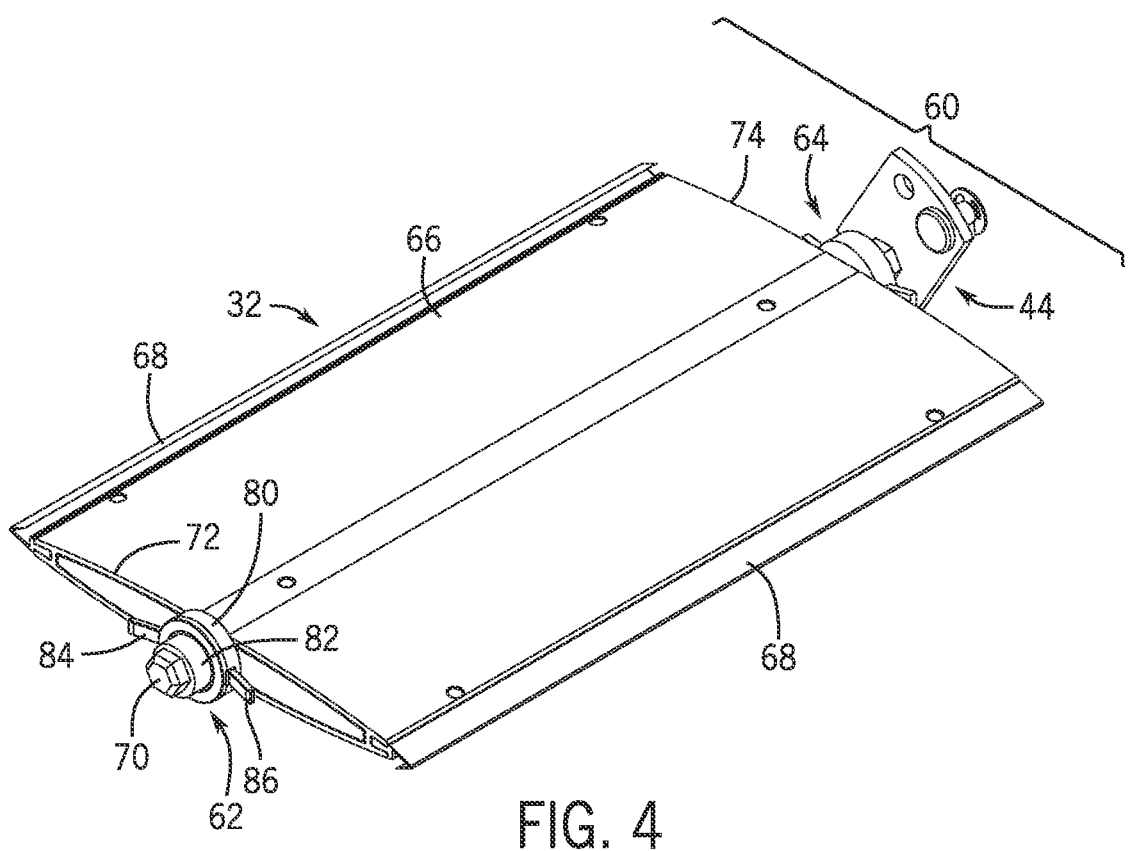
FIG. 4 is a perspective view of a blade assembly for use in a damper employed in the HVAC system of FIG. 1, such as the damper with horizontally oriented blades in FIG. 2, in accordance with an aspect of the present disclosure.

FIG. 4 is a perspective view of an embodiment of a blade assembly 60 for use in the damper 30 employed in the HVAC system 10 of FIG. 1, such as the damper 30*a* with horizontally oriented blades 32 in FIG. 2. The blade assembly 60 includes the blade 32, a first bearing assembly 62, and a second bearing assembly 64. The blade 32 includes the blade body 66, the tip seals 68 disposed along edges of the blade body 66, and an axle 70. In some embodiments, the blade body 66 and the tip seals 68 may together form a generally airfoil shape. The blade body 66 includes a first end 72 and a second end 74, where the axle 70 extends through the first end 72, the second end 74, and internal to the blade body 66. In some embodiments, two instances of the axle 70 may be employed, one each corresponding to the first end 72 and the second end 74 of the blade body 66. The axle 70 may be rigidly coupled to the blade body 66 such that rotation of the axle 70 imparts rotation to the blade body 66 (and, thus, the blade 32). As previously described, the mechanical linkage 44 (a portion of which is illustrated in FIG. 4) may impart rotation to the axle 70 and the axle 70 may impart rotation to the blade 32 (including the blade body 66 and the tip seals 68 coupled to the blade body 66).

In the illustrated embodiment, the bearing assembly 62 includes a spring thrust bearing 80 configured to support an axial load of the blade 32, and a radial bearing 82 configured to support a radial load of the blade 32. The radial bearing 82 may be disposed within a cavity of the spring thrust bearing 80 and may contact the axle 70. In some embodiments, the radial bearing 82 may also interact with the frame 34 of the damper 30 (illustrated in FIGS. 2 and 3) or some other feature to support radial loads of the blade 32.

The spring thrust bearing 80 includes a first spring element (referred to in certain instances below as a first arm 84) and a second spring element (referred to in certain instances below as a second arm 86) cantilevered at non-90 degree angles relative to an outer surface of the spring thrust bearing 80 and configured to contact, for example, a surface of the jamb seal 40 coupled to the frame 34 of the damper 30 (illustrated in FIGS. 2 and 3). The spring thrust bearing 80 also contacts the end 72 of the blade body 66 (and/or an end cap disposed in the end 72 of the blade body 66, described in detail with reference to FIGS. 5 and 6). Accordingly, a spring force is generated between the blade 32 and the frame 34 (illustrated in FIGS. 2 and 3), where the spring force supports axial loads of the blade 32 and maintains an axial position of the blade 32. In some embodiments, the spring thrust bearing 80 does not rotate with the blade 32. For example, the spring thrust bearing 80 may slide along the end 72 of the blade body 66 (and/or the end caps disposed therein, described in detail with reference to FIGS. 5 and 6) as the blade 32 rotates. In other embodiments, the spring thrust bearing 80 may include a first race, a second race, and bearing elements (e.g., balls, rollers, or the like) that enable at least a portion of the spring thrust bearing 80 (e.g., the first race) to rotate in response to rotation of the blade 32. It should be noted that, in some embodiments, the spring thrust bearing 80 may be designed such that it does not directly contact the axle 70. It should also be noted that the bearing assembly 64 on the opposing end 74 of the blade body 66 may be similar to, or the same as, the bearing assembly 62 illustrated at the end 72 of the blade body 66 and described above.

Figure 5:
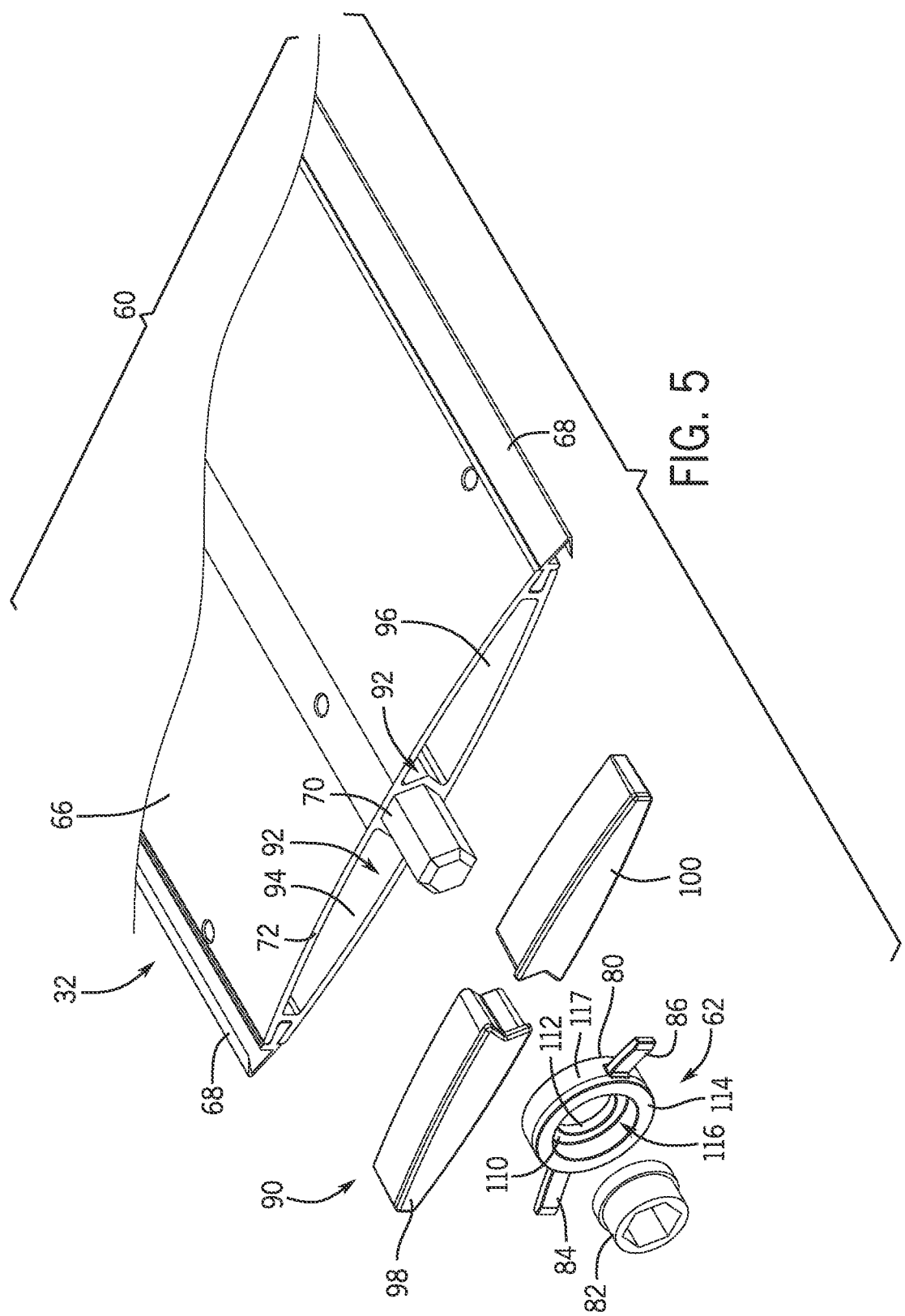
FIG. 5 is an exploded perspective view of a portion of the blade assembly in FIG. 4, in accordance with an aspect of the present disclosure.

FIG. 5 is an exploded perspective view of an embodiment of a portion of the blade assembly 60 in FIG. 4, in which an end cap 90 is employed. In the illustrated embodiment, the blade assembly 60 includes the end cap 90 configured to be disposed within the blade body 66 of the blade 32. For example, the blade body 66 may include a hollow portion 92 having a first hollow segment 94 and a second hollow segment 96. The end cap 90 may include a first end cap segment 98 and a second end cap segment 100. The first end cap segment 98 is configured to be disposed in the first hollow segment 94 of the hollow portion 92 of the blade body 66, and the second end cap segment 100 is configured to be disposed in the second hollow segment 96 of the hollow portion 92 of the blade body 66. The first end cap segment 98 and the second end cap segment 100 may be disposed in the first hollow segment 94 and the second hollow segment 96, respectively, such that the first end cap segment 98 and the second end cap segment 100 are generally flush with the end 72 of the blade body 66. Accordingly, the end cap 90 (e.g., including the first end cap segment 98 and the second end cap segment 100) forms a generally flush surface with the end 72 of the blade body 66, where said generally flush surface contacts (and rotates relative to) another feature, such as a surface of the jamb seal 40 illustrated in the dampers 30a, 30b of FIGS. 2 and 3 (and, in some embodiments, the spring thrust bearing 80). The above-described flushness may enable improved sealing that reduces or negates air flow leakage around the end 72 of the blade body 66 illustrated in FIG. 5 (and, similarly, the opposing end 74 of the blade body 66 illustrated in FIGS. 4 and 7) relative to traditional embodiments. It should be noted that, in certain embodiments, the end cap 90 may include one integrated piece, as opposed to the first end cap segment 98 and the second end cap segment 100 illustrated in FIG. 5. Further, while FIG. 5 illustrates the bearing assembly 62 and the first end 72 of the blade body 66, it should be understood that the bearing assembly 64 and the second end 74 of the blade body 66 illustrated in FIG. 4 may include the same or similar componentry.

The bearing assembly 62 in the illustrated embodiment includes the spring thrust bearing 80 and the radial bearing 82, as previously described. The spring thrust bearing 80 includes a central portion 110 defining a spring thrust bearing opening 112 through which the axle 70 extends. A surface of the central portion 110 of the spring thrust bearing 80 may contact the end 72 of the blade body 66 and/or the end cap 90 disposed in the hollow portion 92 of the blade body 66. The spring thrust bearing 80 also includes a skirt 114 (e.g., circumferential skirt) extending from the central portion 110 of the spring thrust bearing 80 in an axial direction. The skirt 114 may define a cavity 116 in which the radial bearing 82 is configured to be disposed, thereby reducing an axial length of the bearing assembly 62 relative to an embodiment in which the radial bearing 82 is not disposed within the cavity 116 of the skirt 114. Further, the spring elements 84, 86 (or arms) of the spring thrust bearing 80 may extend from an outer surface 117 (e.g., circumferential surface) of the skirt 114, as previously described, where the spring elements 84, 86 are configured to contact, for example, a surface of the jamb seal 40 illustrated in FIG. 2 (or the frame). As shown, the first arm 84 and the second arm 86 are disposed in the illustrated embodiment at opposing sides of the circumferential skirt 114 (e.g., 180 degrees away from each other about the circumferential skirt 114). The radial bearing 82 may engage with (e.g., contact) the axle 70 such that the radial bearing 82 supports radial loads of the blade 32. As previously described, the spring thrust bearing 80 is configured to support axial loads associated with the blades 32 via compression of the spring thrust bearing 80 (e.g., via the spring elements 84, 86) between the end 72 of the blade body 66 and the frame 34 (or jamb seal 40 coupled to the frame 34) of either of the dampers 30a, 30b illustrated in FIGS. 2 and 3.

Figure 6:
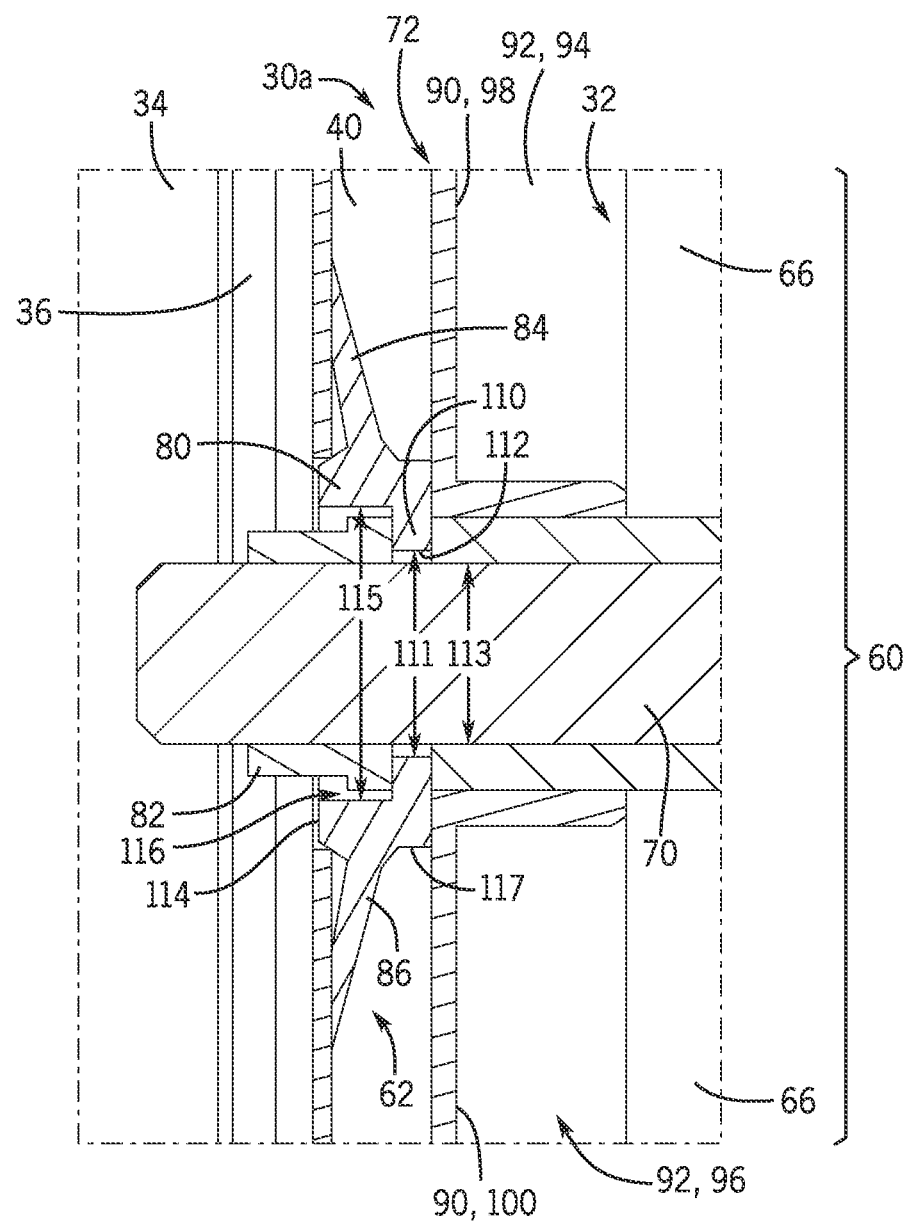
FIG. 6 is a cross-sectional view of a portion of a damper, such as the damper with horizontally oriented blades in FIG. 2, including a portion of the blade assembly in FIG. 4, in accordance with an aspect of the present disclosure.

FIG. 6 is a cross-sectional view of an embodiment of a portion of a damper, such as the damper 30a illustrated in FIG. 2, including a portion of the blade assembly 60 in FIG. 4. In the illustrated embodiment, the axle 70 extends from within the blade body 66 through the end 72 of the blade body 66, where the end 72 is flush with the end cap 90 disposed in the hollow portion 92 of the blade body 66. The axle 70 also extends through the side 36 of the frame 34 of the damper 30a. The bearing assembly 62 includes the spring thrust bearing 80, as previously described, and the axle 70 extends through the opening 112 formed in the central portion 110 of the spring thrust bearing 80. The axle 70 also extends through the radial bearing 82, which sits within the cavity 116 formed by the skirt 114 of the spring thrust bearing 80.

The spring thrust bearing 80 includes the first spring element 84 (or first arm) and the second spring element 86 (or second arm) extending from the skirt 114 of the spring thrust bearing 80, as previously described. The first and second arms 84, 86 are cantilevered from the outer surface 117 of the circumferential skirt 114 and contact, for example, the jamb seal 40 disposed along the side 36 of the frame 34. As will be appreciated in view of later drawings, the jamb seal 40 may include a surface in contact with the arms 84, 86 of the spring thrust bearing 80, and ribs extending from the surface of the jamb seal 40 toward the end 72 of the blade body 66 (and the end cap 90 disposed in the hollow portion 92 of the blade body 66). The ribs of the jamb seal 40 and the end 72 of the blade body 66 (along with the end cap 90) may form a seal that reduces or negates air flow leakage around the end 72 of the blade body 66. Additionally, friction between moving and stationary parts of the blade assembly 60 may be reduced compared to traditional embodiments, thereby reducing an amount of torque required to turn the blade 32 via the axle 70.

Further to the points above, the arms 84, 86 of the spring thrust bearing 80 may press against the jamb seal 40 to generate a spring force between the frame 34 and the blade 32, thereby supporting an axial load of the blade 32 and maintaining an axial position of the blade 32. Supporting the axial load of the blade 32 and maintaining the axial position of the blade 32 may further reduce air flow leakage around the end 72 of the blade body 66. As previously described, in some embodiments, the spring thrust bearing 80 may not contact the axle 70. For example, the opening 112 of the spring thrust bearing 80 may include an inner diameter 111 that is greater than an outer diameter 113 of the axle 70 adjacent to the opening 112. However, in some embodiments, the spring thrust bearing 80 may contact the axle 70. Further, it should be noted that the skirt 114 may include an inner diameter 115 that is greater than the inner diameter 111 of the spring thrust bearing opening 112. The cavity 116, then, is formed above the central portion 110 of the spring thrust bearing 80 and radially inward from the inner diameter 115 of the skirt 114. The radial bearing 82 in the illustrated embodiment sits within the cavity 116 and contacts the axle 70 to support a radial load of the blade 32, which includes the axle 70. Accordingly, rotation of the blade 32 (including the axle 70) may cause the radial bearing 82 to rotate.

Figure 7:
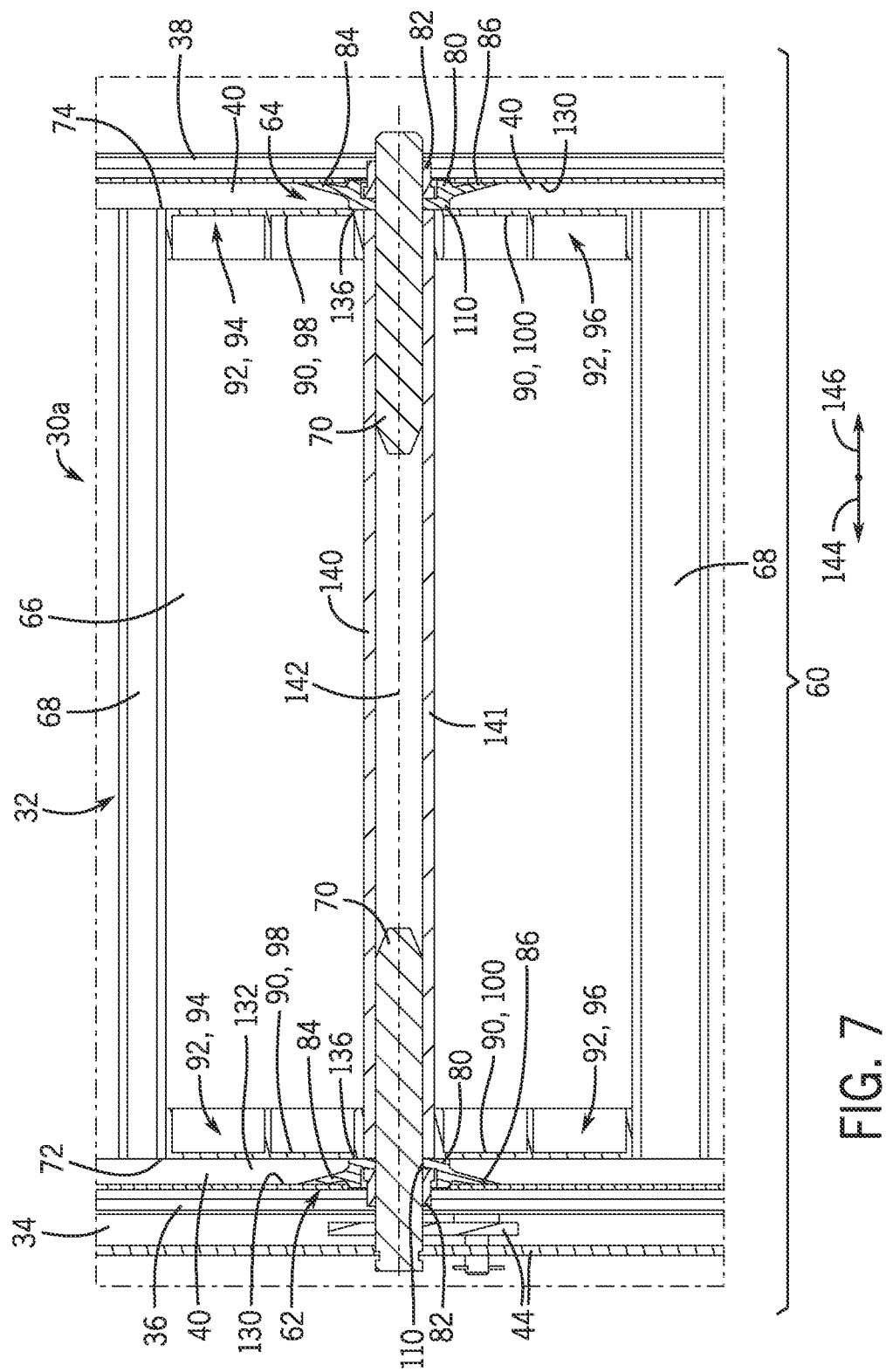
FIG. 7 is a cross-sectional view of a portion of a damper, such as the damper with horizontally oriented blades in FIG. 2, including the blade assembly in FIG. 4, in accordance with an aspect of the present disclosure.

FIG. 7 is a cross-sectional view of an embodiment of a portion of a damper, such as the damper 30*a* illustrated in FIG. 2, including the blade assembly 60 in FIG. 4. In the illustrated embodiment, the damper 30*a* includes the frame 34, the blade assembly 60 including the blade 32 (with the blade body 66 and tip seals 68) disposed within the frame 34, the first bearing assembly 62, and the second bearing assembly 64. For brevity, only components of the first bearing assembly 62 adjacent the first end 72 of the blade body 66 are described below, although it should be understood that the second bearing assembly 64 adjacent the second end 74 of the blade body 66 may include the same or similar features as the first bearing assembly 62.

As previously described, a first jamb seal 40 is disposed along the first side 36 of the frame 34 and a second jamb seal 40 is disposed along the second side 38 of the frame 34. For brevity, only the first jamb seal 40 adjacent the first side 36 of the frame 34 is described below, although it should be understood that the second jamb seal adjacent the second side 38 of the frame 34 may include the same or similar features. The first jamb seal 40 includes a surface 130 contacted by the arms 84, 86 of the spring thrust bearing 80 of the first bearing assembly 62. The first jamb seal 40 also include ribs 132 that extend toward (and contact) the end 72 of the blade body 66 and/or the end cap 90 disposed in the hollow portion 92 of the blade body 66 (e.g., where the end cap 90 is flush with the end 72 of the blade body 66). Further, a bottom surface 136 of the spring thrust bearing 80 may contact the end 72 of the blade body 66 and/or the end cap 90 disposed in the hollow portion 92 of the blade body 66. As previously described, the above-described features are configured to general a seal that blocks air flow leakage round the end 72 of the blade body 66 (e.g., between the side 36 of the frame 34 and the end 72 of the blade body 66).

In FIG. 7, two instances of the axle 70 are employed, where one instance of the axle 70 extends through the first bearing assembly 62 and the other instance of the axle 70 extends through the second bearing assembly 64. As shown, the axles 70 extend into a tunnel 140 formed in the blade body 66 of the blade 32, where a hollow portion 141 extends between the two instances of the axle 70. In another embodiment, a single axle 70 may extend through the entirety of the tunnel 140. The axles 70 generally form an axis 142 about which the blade 32 is configured to rotate. As previously described, the spring thrust bearing(s) 80 are configured to maintain an axial position of the blade 32. That is, the spring thrust bearing(s) 80 are configured to block axial movement of the blade 32 along the axis 142 in a first axial direction 144 or second axial direction 146.

Figure 8:
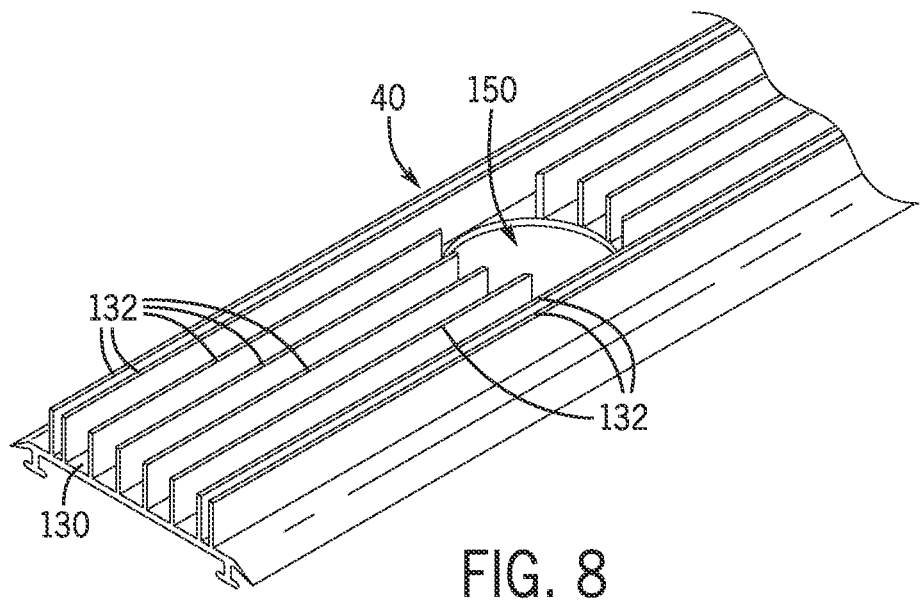
FIG. 8 is a perspective view of a jamb seal for use in a damper of the HVAC system of FIG. 1, in accordance with an aspect of the present disclosure.
Figure 9:
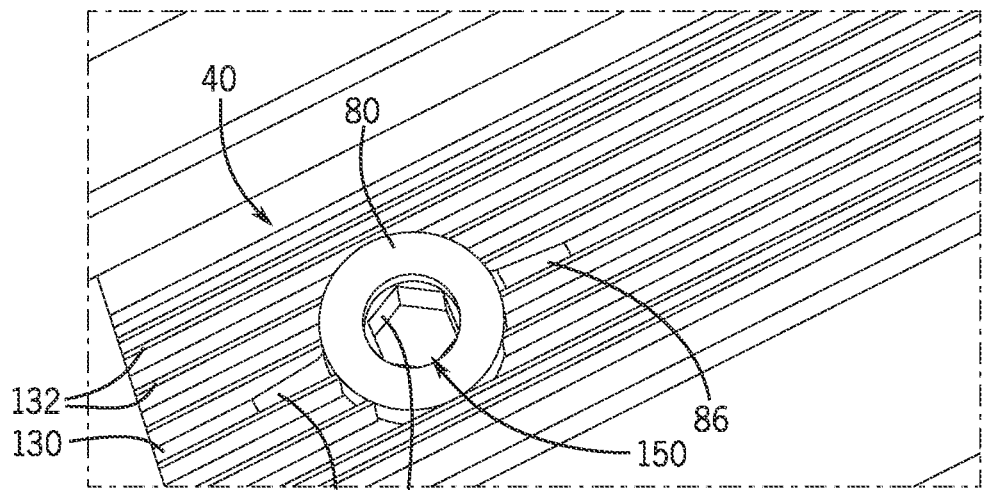
FIG. 9 is a perspective view of a jamb seal and spring thrust bearing for use in a damper of the HVAC system of FIG. 1, in accordance with an aspect of the present disclosure.
Figure 10:
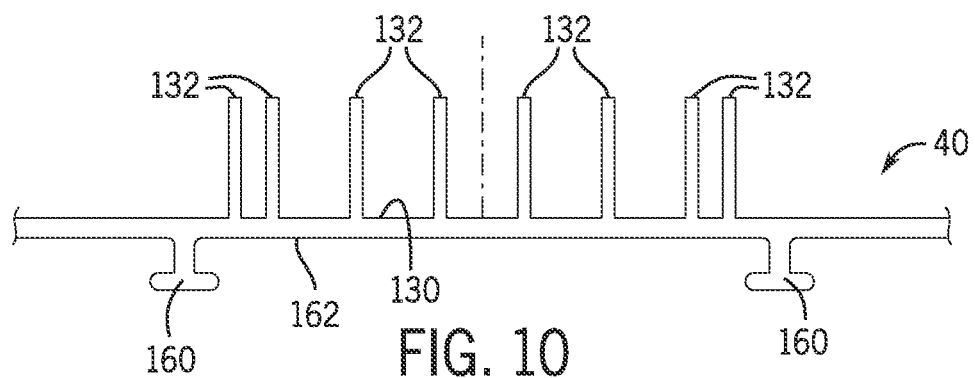
FIG. 10 is a cross-sectional view of a jamb seal for use in a damper of the HVAC system of FIG. 1, in accordance with an aspect of the present disclosure.

FIG. 8 is a perspective view of an embodiment of the jamb seal 40 for use in the damper 30 of the HVAC system 10 of FIG. 1. As previously described, the jamb seal 40 includes the surface 130 and the ribs 132 extending from the surface 130. The jamb seal 40 also includes an opening 150 through which, for example, the axle 70 (illustrated in at least FIGS. 4-7) extends. FIG. 9 is a perspective view of an embodiment of the jamb seal 40 and the spring thrust bearing 80 for use in the damper 30 of the HVAC system 10 of FIG. 1. As shown in FIG. 9, the arms 84, 86 of the spring thrust bearing 80 extend between two of the ribs 132 of the jamb seal 40 and contact the surface 130 of the jamb seal 40 from which the ribs 132 extend. The radial bearing 82 is also shown in FIG. 9. A portion of the radial bearing 82 may extend through the opening 150 (illustrated in FIG. 8) formed in the jamb seal 40. It should be noted that the jamb seals 40 illustrated in FIGS. 8 and 9 are provided merely as examples, and that the geometry of the jamb seals 40 may differ in other embodiments in accordance with the present disclosure. A cross-sectional view of another embodiment of the jamb seal 40 is illustrated in FIG. 10, where the jamb seal 40 includes the features described above and plugs 160 configured to engage the jamb seal 40 with the frame 34 of the damper 30 (e.g., the frame 34 illustrated at least in FIGS. 2-7). The plugs 160 are disposed on surface 162 of the jamb seal 40 opposing the surface 130. In other embodiments, engagement features other than the plugs 160 may be employed for the jamb seal 40 (e.g., adhesive, fasteners, etc.).

Figure 11:
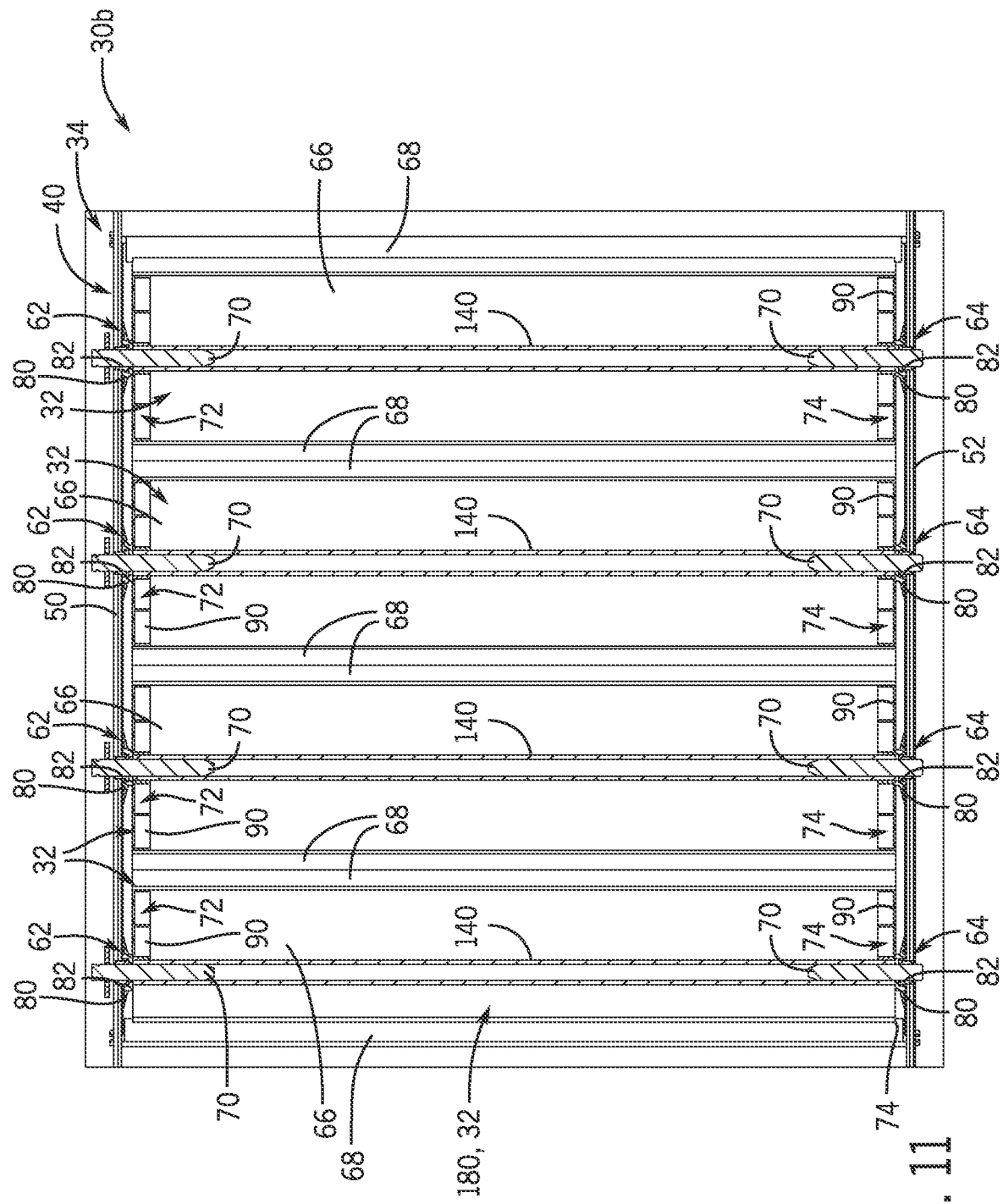
FIG. 11 is a cross-sectional view of a damper, such as the damper with vertically oriented blades in FIG. 3, in accordance with an aspect of the present disclosure.

FIG. 11 is a cross-sectional view of an embodiment of a damper, such as the damper 30*b* with vertically oriented blades 32 in FIG. 3. In the illustrated embodiment, the damper 30*b* includes blades 32 (e.g., formed by blade bodies 66 and tip seals 68) disposed within the frame 34 of the damper 30*b*. Similar to the damper 30*a* with horizontally oriented blades 32, the damper 30*b* with vertically oriented blades 32 in the illustrated embodiment includes first and second bearing assemblies 62, 64 at opposing ends 72, 74, respectively, of the blade body 66. Further, each end 72, 74 of each blade body 66 includes the end caps 90 disposed therein such that the end caps 90 are flush with the ends 72, 74 of the blade body 66. The jamb seals 40 are generally configured to contact the flush surface formed by the combination of the end caps 90 and corresponding ends 72, 74 of the blade body 66. Each of the bearing assemblies 62, 64 includes the spring thrust bearing 80 and the radial bearing 82, where the axle(s) 70 extend through the bearing assemblies 62, 64. The bearing assembly 62 will be described in detail below with reference to FIG. 12 and the bearing assembly 64 will be described in detail below with reference to FIG. 13. Further, it should be noted that one of the blades 32 in FIG. 11 is a trimmed blade 180. The trimmed blade 180 may be trimmed such that it fits within the frame 34 of the damper 30*b*, along with the other blades 32 that are not trimmed. That is, in certain embodiments, the frame 34 may define a space that is sized such a particular number of fully formed blades 32 does not fill the entire space. Accordingly, one of the blades 32 may be trimmed such that the space defined by the frame 34 is accurately filled. The trimmed blade 180 will be described in detail below with reference to FIG. 14.

Figure 12:
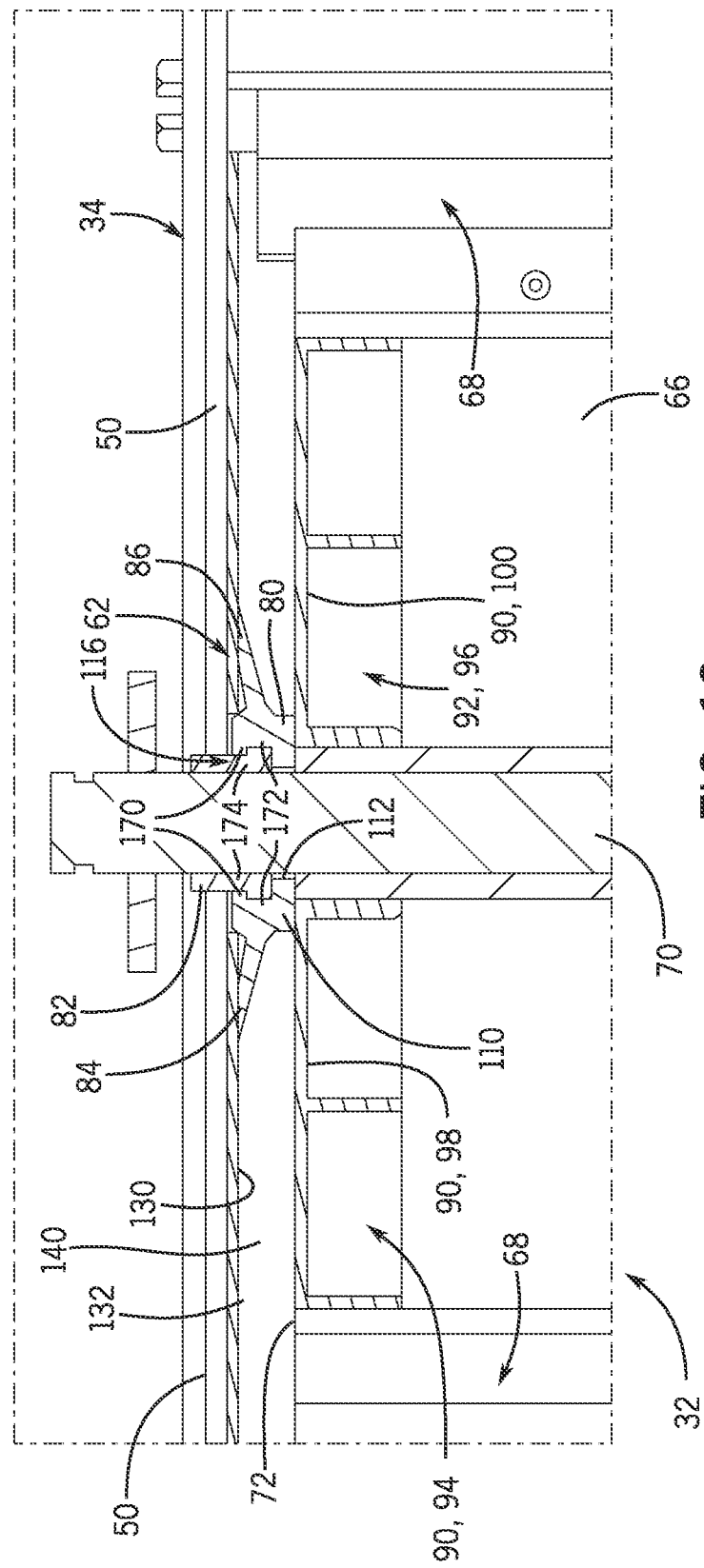
FIG. 12 is a cross-sectional view of a portion of a top side of the damper of FIG. 11, in accordance with an aspect of the present disclosure.
Figure 13:
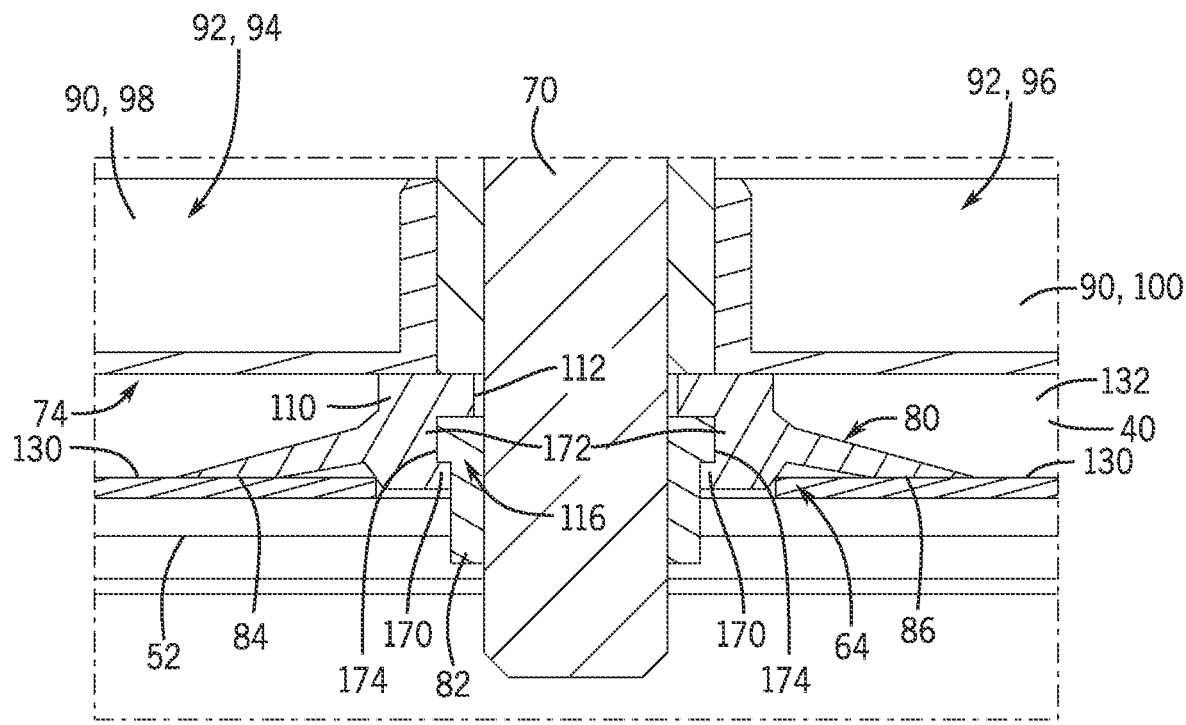
FIG. 13 is a cross-sectional view of a portion of a bottom side of the damper of FIG. 11, in accordance with an aspect of the present disclosure.

FIG. 12 is a cross-sectional view of an embodiment of a portion of a top side 50 of the damper 30*b* of FIG. 11, including the bearing assembly 62. The bearing assembly 62 includes the spring thrust bearing 80 and the radial bearing 82. In the illustrated embodiment, the spring thrust bearing 80 includes a flange 170 defining a groove 172 residing within the cavity 116 formed above the central portion 110 of the spring thrust bearing 80. The groove 172 formed within the cavity 116 may be configured to receive a flange 174 of the radial bearing 82. In some embodiments, the spring thrust bearing 80 does not contact the axle 70, while the radial bearing 82 contacts the axle 70 (e.g., via an interference fit). In other embodiments, the spring thrust bearing 80 may also contact the axle 70. In either embodiment, the spring thrust bearing 80 includes the arms 84, 86 that contact the surface 130 of the jamb seal 40, thereby reducing or negating air flow leakage therebetween. The jamb seal 40 also includes the ribs 132 extending toward, and contacting, the end 72 of the blade body 66 and/or the end cap 90 flush with the end 72 of the blade body 66. In some embodiments, the radial bearing 82 may be heated to expand the radial bearing 82, which then compresses around the axle 70 as the radial bearing cools. Other techniques can also be used to engage the radial bearing 82 with the axle 70. FIG. 13 is a cross-sectional view of an embodiment of a portion of a bottom side 52 of the damper 30b of FIG. 11, including the bearing assembly 64. The bearing assembly 64 in FIG. 13 includes the same or similar features as the bearing assembly 62 in FIG. 12. The spring thrust bearings 80 of the bearing assembly 62 in FIG. 12 and the bearing assembly 64 in FIG. 13 support axial loads of the blade 32 to maintain an axial position of the blade 32, thereby reducing air flow leakage that could otherwise be caused by axial movement of the blade 32. As previously described, the bearing assemblies 62, 64 employed in the vertically oriented blades 32 may block a weight of the blades 32 from causing the blades 32 to move downwardly (e.g., toward the lower side 52 of the frame 34 illustrated in FIG. 13). In doing so, the bearing assemblies 62, 64 block a gap from forming toward the upper side 50 of the frame 34. By blocking formation of the gap, air flow leakage is reduced compared to traditional embodiments.

Figure 14:
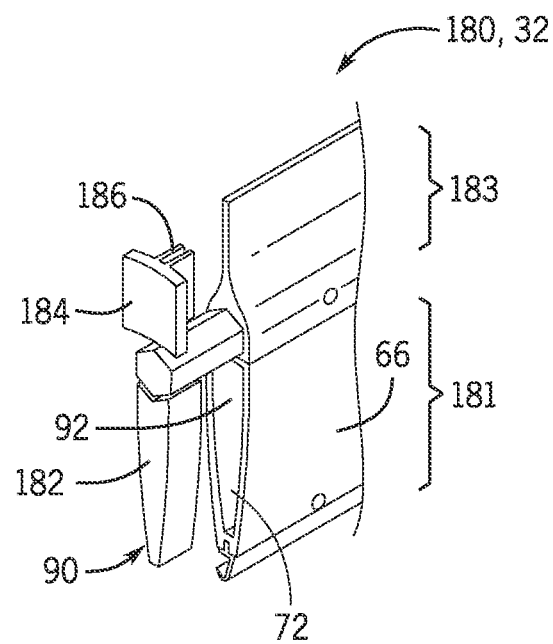
FIG. 14 is a perspective view of a trimmed blade for use in a damper of the HVAC system of FIG. 1, in accordance with an aspect of the present disclosure.

FIG. 14 is a perspective view of an embodiment of a trimmed blade 180 for use in the damper 30 of the HVAC system 10 of FIG. 1. The trimmed blade 180 includes the blade body 66 which, in the illustrated embodiment, includes a full first side 181 and a trimmed second side 183. The full first side 181 of the blade body 66 may define the hollow portion 92 configured to receive the end cap 90. That is, the trimmed second side 183 in the illustrated embodiment is not hollow. The end cap 90 includes a first end cap segment 182 and a second end cap segment 184. The first end cap segment 182 may be disposed in the hollow portion 92 of the blade body 66 such that it is flush with the end 72 of the blade body 66. The second end cap segment 184 may include extensions 186 that receive the trimmed second side 183 of the blade body 66. The first end cap segment 182 and the second end cap segment 184 may be flush with one another (and/or with a portion of the end 72 of the blade body 66). The above-described features may be employed in the trimmed blade 180, as previously described, such that the trimmed blade 180 fills an area of a damper frame that is too small to receive a fully formed blade 32. Although not shown in the illustrated embodiment, it should be appreciated that the trimmed blade 180 may include bearing assemblies similar to, or the same as, those included in FIGS. 4-13, such that radial and axial loads associated with the trimmed blade 180 are supported, and such that undesirable air flow leakage around the trimmed blade 180 is negated or reduced relative to traditional embodiments.

One or more of the disclosed embodiments, alone or in combination, may provide one or more technical effects useful in dampers of HVAC systems. For example, presently disclosed features are configured to reduce an amount of torque utilized to adjust the damper between various settings (e.g., fully open, fully closed, partially open) relative to traditional embodiments. Further, presently disclosed features are configured to negate or reduce undesirable air flow leakage through the damper relative to traditional embodiments.

While only certain features and embodiments of the disclosure have been illustrated and described, many modifications and changes may occur to those skilled in the art, such as variations in sizes, dimensions, structures, shapes and proportions of the various elements, values of parameters including temperatures and pressures, mounting arrangements, use of materials, colors, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A damper of a heating, ventilation, and/or air conditioning (HVAC) system, the damper comprising:
   a damper blade;
   an axle defining an axis about which the damper blade is configured to rotate; and
   a spring thrust bearing having a central portion defining a spring thrust bearing opening configured to receive the axle, wherein the spring thrust bearing is configured to support an axial load of the damper blade via a spring force applied to the damper blade, and wherein the spring thrust bearing comprises:
      a circumferential skirt extending from the central portion of the spring thrust bearing;
      a first arm disposed at a first circumferential location of the circumferential skirt; and
      a second arm disposed at a second circumferential location of the circumferential skirt, wherein the first arm and the second arm are configured to exert the spring force between the damper blade and a damper frame of the damper to bias the damper blade away from the damper frame.

2. The damper of claim 1, wherein:
   the first arm is cantilevered at a first non-90 degree angle away from an outer surface of the circumferential skirt; and
   the second arm is cantilevered at a second non-90 degree angle away from the outer surface of the circumferential skirt.

3. The damper of claim 1, wherein the first circumferential location and the second circumferential location are approximately 180 degrees apart from each other about the circumferential skirt.

4. The damper of claim 1, comprising:
a blade body of the damper blade, wherein the blade body comprises an end from which the axle extends, and the blade body comprises a hollow portion extending to the end of the blade body; and
an end cap configured to be disposed within the hollow portion of the blade body such that the end cap is flush with the end of the blade body.

5. The damper of claim 4, wherein the central portion of the spring thrust bearing is configured to contact the end cap, the end of the blade body, or both.

6. The damper of claim 1, comprising:
a blade body of the damper blade, wherein the blade body comprises an end from which the axle extends, and the blade body comprises a hollow portion extending to the end of the blade body;
an end cap configured to be disposed within the hollow portion of the blade body;
a damper frame configured to receive the damper blade; and
a jamb seal configured to be disposed along a wall of the damper frame, wherein the jamb seal comprises a rib in contact with the end of the blade body, the end cap, or both.

7. The damper of claim 1, comprising a radial bearing defining a radial bearing opening configured to receive the axle, wherein the spring thrust bearing comprises a skirt extending from the central portion of the spring thrust bearing, the skirt defines a cavity, and the skirt is configured to receive the radial bearing in the cavity.

8. The damper of claim 7, wherein:
the spring thrust bearing opening comprises a first inner diameter defined by the central portion of the spring thrust bearing;
the cavity comprises a second inner diameter defined by the skirt; and
the second inner diameter is greater than the first inner diameter.

9. A damper of a heating, ventilation, and/or air conditioning (HVAC) system, the damper comprising:
a damper blade;
an axle defining an axis about which the damper blade is configured to rotate;
a spring thrust bearing having a central portion defining a spring thrust bearing opening configured to receive the axle, having a skirt extending from the central portion, and having an arm extending from the skirt, wherein the spring thrust bearing is configured to support an axial load of the damper blade via the arm exerting at least a portion of a spring force of the spring thrust bearing between the damper blade and a damper frame of the damper to bias the damper blade away from the damper frame; and
a radial bearing defining a radial bearing opening configured to receive the axle such that the radial bearing is configured to support a radial load of the damper blade, wherein the skirt is configured to receive the radial bearing in a cavity defined by the skirt.

10. The damper of claim 9, wherein the spring thrust bearing comprises an additional arm extending from the skirt, wherein the spring thrust bearing is configured to support the axial load of the damper blade via the additional arm exerting an additional portion of the spring force of the spring thrust bearing between the damper blade and the damper frame of the damper to bias the damper blade away from the damper frame.

11. The damper of claim 10, wherein:
the arm is cantilevered at a first non-90 degree angle away from an outer surface of the skirt; and
the additional arm is cantilevered at a second non-90 degree angle away from the outer surface of the skirt.

12. The damper of claim 9, comprising:
a blade body of the damper blade, wherein the blade body comprises an end from which the axle extends, and the blade body comprises a hollow portion extending to the end of the blade body; and
an end cap of the damper blade, wherein the end cap is configured to be disposed within the hollow portion of the blade body such that the end cap is flush with the end of the blade body, and wherein the central portion of the spring thrust bearing is configured to contact the end cap, the end of the blade body, or both.

13. The damper of claim 9, comprising:
the damper frame; and
a plurality of damper blades disposed within the damper frame, wherein the plurality of damper blades comprises the damper blade.

14. A damper of a heating, ventilation, and/or air conditioning (HVAC) system, the damper comprising:
a damper blade comprising a blade body including a hollow portion extending to an end of the blade body;
an axle defining an axis about which the damper blade is configured to rotate, wherein the axle extends from the end of the blade body;
a spring thrust bearing having a spring thrust bearing opening through which the axle extends, wherein the spring thrust bearing comprises a central portion defining the spring thrust bearing opening through which the axle extends, a circumferential skirt extending from the central portion of the spring thrust bearing, a first arm disposed at a first circumferential location of the circumferential skirt, and a second arm disposed at a second circumferential location of the circumferential skirt, and wherein the first arm and the second arm are configured to exert a spring force between a damper frame of the damper and the damper blade to bias the damper blade away from the damper frame such that the spring thrust bearing supports an axial load of the damper blade; and
an end cap disposed within the hollow portion of the blade body such that the end cap is flush with the end of the blade body.

15. The damper of claim 14, comprising a jamb seal disposed along a side of the damper frame, wherein the first arm and the second arm contact the jamb seal.

16. The damper of claim 14, comprising a radial bearing defining a radial bearing opening through which the axle extends, wherein:
the circumferential skirt defines a cavity; and
the circumferential skirt receives the radial bearing in the cavity.

* * * * *